(12) United States Patent
Fisher

(10) Patent No.: US 6,986,534 B2
(45) Date of Patent: Jan. 17, 2006

(54) DOOR LATCH MECHANISM

(75) Inventor: Sidney Fisher, West Midlands (GB)

(73) Assignee: Meritor Light Vehicle Systems (UK) Ltd., Birmingham (GB)

(*) Notice: Subject to any disclaimer, the term of this patent is extended or adjusted under 35 U.S.C. 154(b) by 0 days.

(21) Appl. No.: 10/780,068

(22) Filed: Feb. 17, 2004

(65) Prior Publication Data
US 2004/0160066 A1 Aug. 19, 2004

Related U.S. Application Data

(62) Division of application No. 10/080,365, filed on Feb. 21, 2002, now abandoned.

(51) Int. Cl.
E05C 3/06 (2006.01)
E05C 3/16 (2006.01)

(52) U.S. Cl. ............................. 292/216; 292/DIG. 23
(58) Field of Classification Search ............... 292/216, 292/DIG. 23
See application file for complete search history.

(56) References Cited

U.S. PATENT DOCUMENTS

| | | | | |
|---|---|---|---|---|
| 4,948,183 A | * | 8/1990 | Yamada | 292/199 |
| 5,531,488 A | | 7/1996 | Yoshikuwa et al. | |
| 5,577,583 A | * | 11/1996 | O'Donnell | 192/79 |
| 5,577,782 A | | 11/1996 | Johnson et al. | |
| 5,584,515 A | * | 12/1996 | Silye | 292/201 |
| 5,605,363 A | | 2/1997 | Kapes | |
| 5,634,677 A | | 6/1997 | Buscher et al. | |
| 5,656,899 A | * | 8/1997 | Kuroda | 318/283 |
| 5,667,260 A | | 9/1997 | Weyerstall | |
| 5,718,465 A | | 2/1998 | Dowling et al. | |
| 5,722,272 A | | 3/1998 | Bridgeman et al. | |
| 5,853,206 A | | 12/1998 | Kleefeldt et al. | |
| 5,887,466 A | * | 3/1999 | Yoshizawa | 70/257 |
| 5,899,508 A | | 5/1999 | Cetnar et al. | |
| 5,921,594 A | | 7/1999 | Bendel | |
| 5,931,034 A | * | 8/1999 | Fisher | 70/264 |
| 5,992,194 A | * | 11/1999 | Baukholt et al. | 70/279.1 |
| 6,089,057 A | * | 7/2000 | Spurr | 70/264 |
| 6,279,361 B1 | * | 8/2001 | Baukholt et al. | 70/279.1 |
| 6,367,296 B1 | | 4/2002 | Dupont | |
| 6,428,058 B1 | | 8/2002 | Graute | |

(Continued)

FOREIGN PATENT DOCUMENTS

EP 0 659 965 A2 6/1995

(Continued)

OTHER PUBLICATIONS

European Search Report Dec. 2, 2003.

Primary Examiner—John B. Walsh
(74) Attorney, Agent, or Firm—Carlson, Gaskey & Olds

(57) ABSTRACT

A latch mechanism has an input member and an output member. The mechanism has a first coupled condition at which the input and output members are coupled such that movement of the input member from its first position to its second position causes movement of the output member from its first position to its second position. The mechanism has a decoupled condition at which the input member is not coupled to the output member. The mechanism further includes a block member, which, with the mechanism in the decoupled condition, further prevents at least one of the input and output member from moving to its respective second position.

15 Claims, 4 Drawing Sheets

U.S. PATENT DOCUMENTS

| | | | |
|---|---|---|---|
| 6,520,549 B1 * | 2/2003 | Kalsi | 292/216 |
| 6,523,376 B2 * | 2/2003 | Baukholt et al. | 70/256 |
| 6,601,883 B1 * | 8/2003 | Kalsi | 292/216 |
| 6,607,222 B2 * | 8/2003 | Inoue | 292/216 |
| 6,652,009 B2 * | 11/2003 | Fisher et al. | 292/251.5 |
| 6,729,663 B2 * | 5/2004 | Fisher | 292/201 |

FOREIGN PATENT DOCUMENTS

| | | |
|---|---|---|
| EP | 0 775 791 A1 | 5/1997 |
| EP | 1 001 119 A1 | 5/2000 |
| GB | 900677 | 7/1962 |
| GB | 2 313 619 A | 12/1997 |

\* cited by examiner

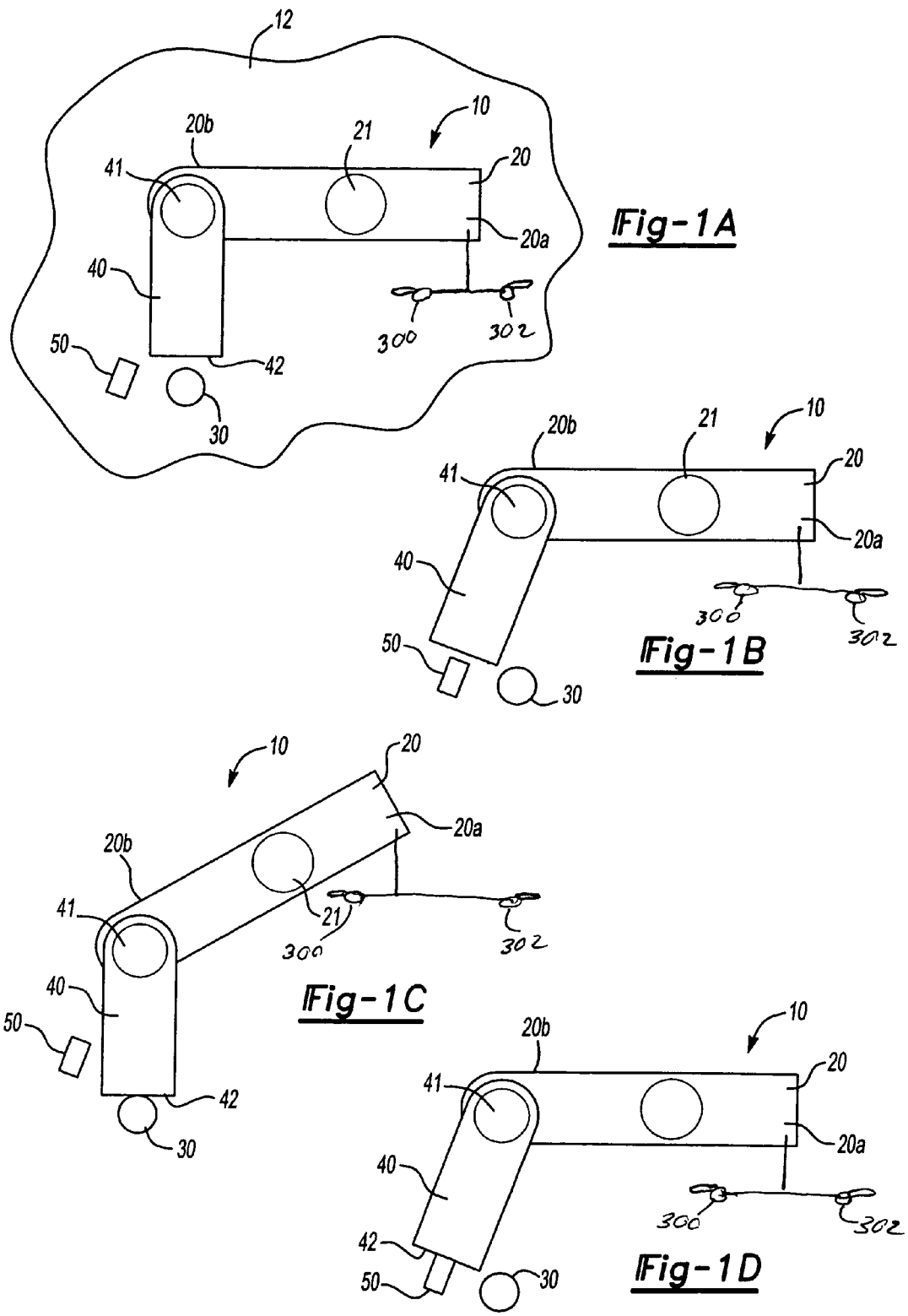

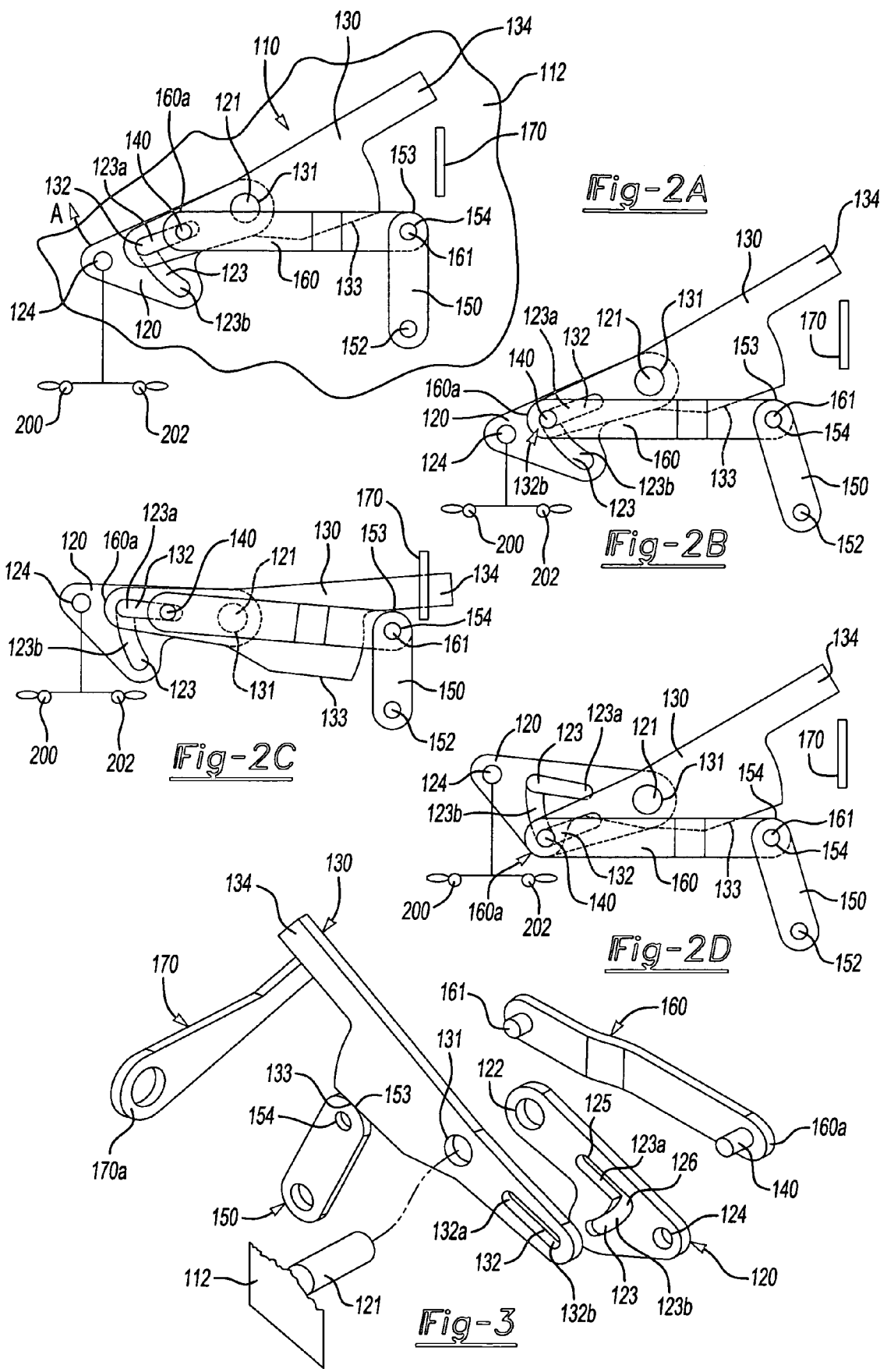

DOOR LATCH MECHANISM

This application is a divisional patent application claiming priority to U.S. Nonprovisional patent application Ser. No. 10/080,365, filed on Feb. 21, 2002, now abandoned, which claims priority to United Kingdom (GB) Patent Application Number 0105120.0 filed on 2, Mar. 2001.

BACKGROUND OF THE INVENTION

The present invention relates to mechanism, for a vehicle door latch.

Known vehicle door latches are lockable using a "free wheeling" principle. Thus, with the door unlocked, lifting of an outside door handle causes the door latch to open. Conversely, with the door locked, lifting of the outside door handle is still possible but a transmission path between the outside door handle and components of the door latch that retains the door in the closed position is broken. Essentially, a break is created in the transmission path. The components on the door handle side of the break are caused to move with the door handle while the components on the other side of the break do not move. A problem with this type of locking is that a space has to be provided for the components on the handle side of the break to move when the handle is lifted.

SUMMARY OF THE INVENTION

An inventive latch mechanism has an input member and an output member. The latch mechanism has a first condition at which the input and output member are coupled such that movement of the input member from its first position to its second position causes movement of the output member from its first position to its second position. The latch mechanism also has a second condition at which the input member is not coupled to the output member. The latch mechanism further has a blocking member, which, with the mechanism in its second condition, further prevents one of the input or output members from moving to its respective second position.

BRIEF DESCRIPTION OF THE DRAWINGS

The invention will now be described, by way of example only, with reference to the accompanying drawings in which:

FIGS. 1A to 1D show a first embodiment of the present invention in various positions;

FIGS. 2A to 2D show a second embodiment of the present invention in various positions;

FIG. 3 shows an isometric exploded view of FIG. 2A; and

DETAILED DESCRIPTION OF THE PREFERRED EMBODIMENTS

Figure 4A:
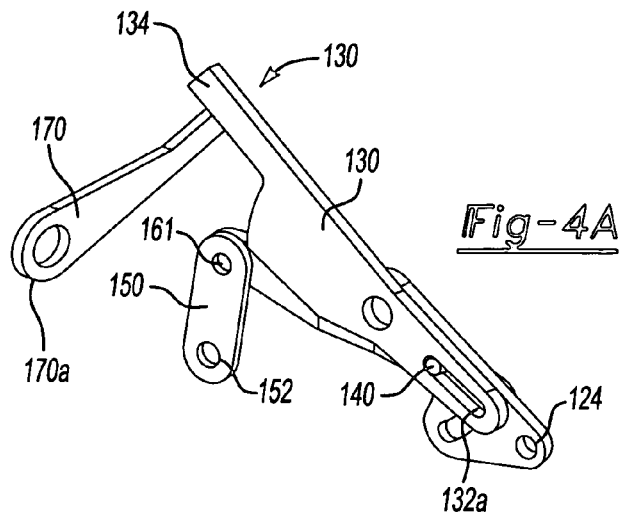
FIGS. 4A to 4D and 5A and 5D show isometric views of FIGS. 2A to 2D, respectively.
Figure 4B:
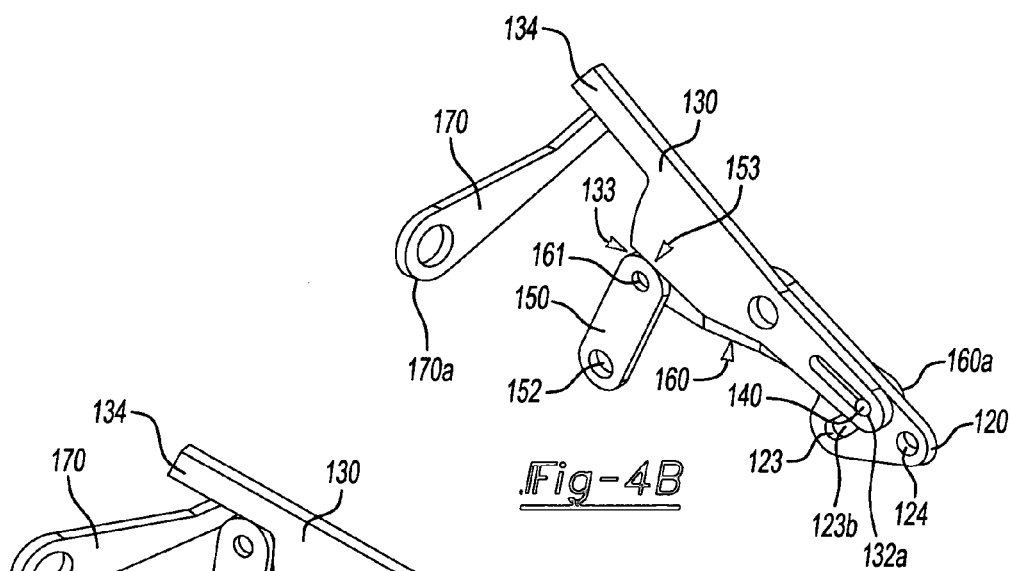
Figure 4C:
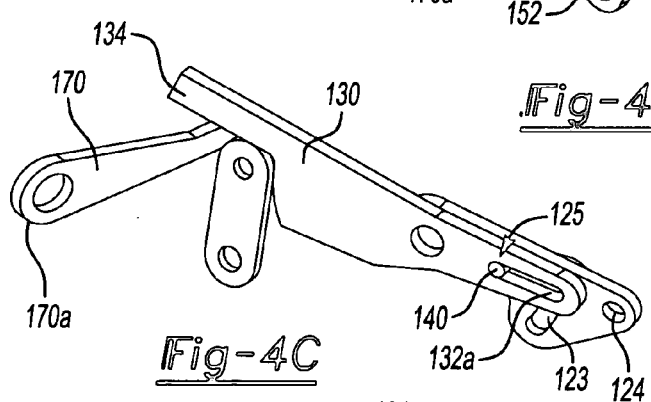
Figure 4D:
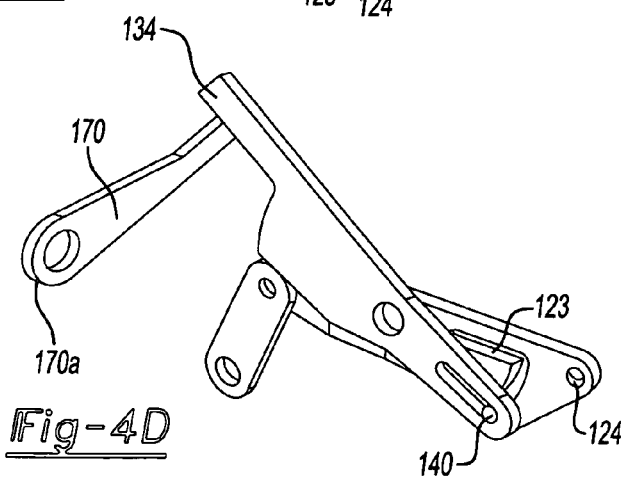
Figure 5A:
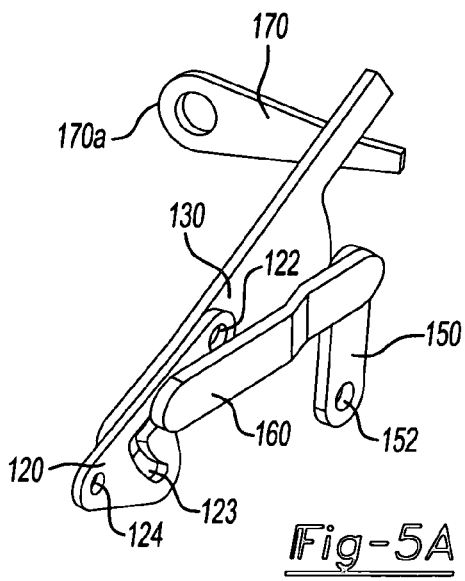
Figure 5B:
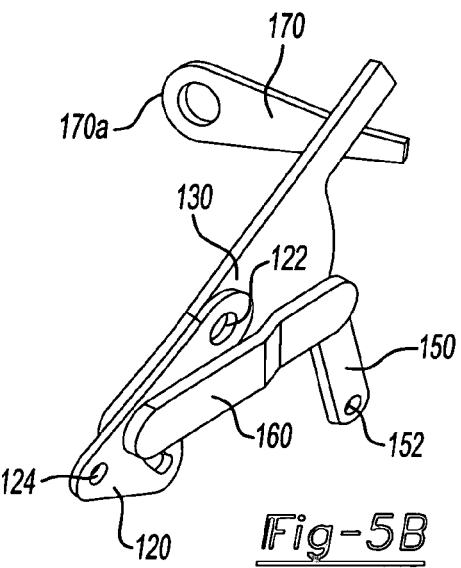
Figure 5C:
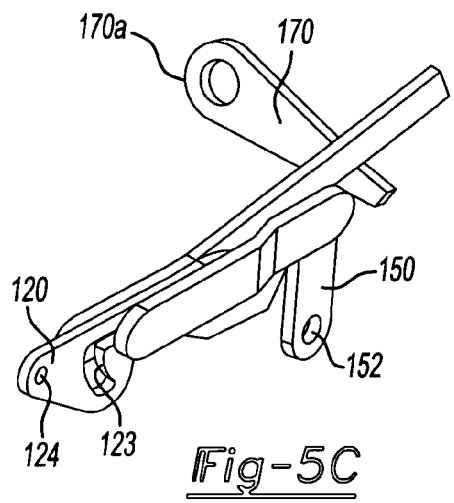
Figure 5D:
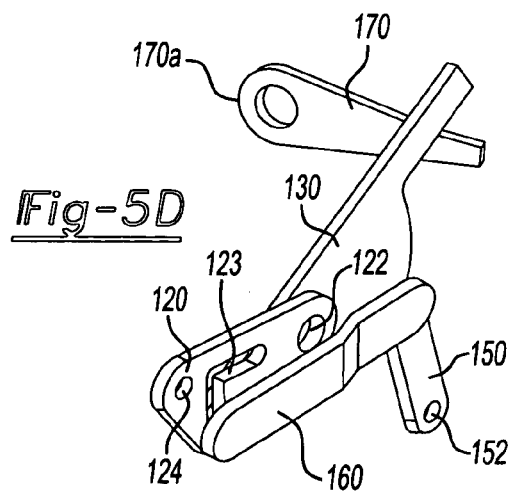

With reference to FIGS. 1A to 1D, there is shown a latch mechanism 10 mounted on a chassis 12 (only shown in FIG. 1A). A latch mechanism 10 includes an input member in the form of an input lever 20, an output member in the form of a pin 30, a clutch in the form of a link 40 and a blocking member 50.

The input lever 20 is pivotally mounted at an input pivot 21 to the chassis 12. The link 40 is pivotally mounted at pivot 41 to an end 20B of the input lever 20. The blocking member 50 is fixed in a stationary position on the chassis 12.

The pin 30 is movable between the positions as shown in FIG. 1A and FIG. 1C. The latch mechanism 10 typically forms part of a vehicle door latch arrangement. An inside door handle 300 and an outside door handle 302 are connected by a transmission path to an end 20A of the input lever 20. The pin 30 is connected to a pawl, which is capable of retaining a latch bolt (e.g., a rotating claw) in a closed position. The claw in turn can releasably retain a latch striker in order to retain an associated door in a closed position. Movement of the pin 30 from the position shown in FIG. 1A to the position shown in FIG. 1C causes the pawl to disengage the claw and allow the door to open. Thus, with the latch mechanism 10 in the position as shown in FIG. 1A, the door is in an unlocked condition. Operation of the inside door handle 300 or the outside door handle 302 will cause the end 20A of the input lever 20 to lift (i.e., the input lever 20 will rotate in counter-clockwise direction), causing the end 20B to lower. This movement of the end 20B results in an abutment 42 contacting and then moving the pin 30 to the position shown in FIG. 1C. It should be noted that in FIGS. 1A and 1C, the pivot 41, the abutment 42 and the pin 30 are all aligned.

The latch mechanism 10 can be put into a locked condition as shown in FIG. 1B by rotating the link 40 so that it aligns with the blocking member 50 and no longer aligns with the pin 30. Thus, when an attempt is made to lift the outside door handle 300, the abutment 42 moves into contact with the blocking member 50, and the outside door handle 300 cannot be fully lifted. The door therefore remains fully closed.

Thieves tend to apply excessive force to outside door handles 300 in the expectation of causing components of the door latch to fail in an attempt to gain entry to the vehicle. However, the present invention mitigates this problem. In the event that the blocking member 50 fails (e.g., it breaks off the chassis 12), the abutment 42 will bypass the pin 30. Thus, the door still remains closed.

Under normal circumstances, the abutment 42 does not enter the space occupied by the blocking member 50. Consequently, this space is available for other components of the latch, enabling a more compact latch design. Preferably, the blocking member 50 is not solely dedicated to acting just as a blocking member, but fulfills another function within the latch to further save space.

With reference to FIGS. 2A to 5C, there is shown a further embodiment of the invention. The latch mechanism 110 has components that fulfill substantially the same function as those in the latch mechanism 10.

The input lever 120 includes a hole 122, which mounts on an input pivot pin 121, which in turn is mounted on a chassis 112. The input lever 120 includes an L shaped hole 123 and a further hole 124 for connection to an inside door handle 200 or an outside door handle 202.

In this case, the output member is in the form of an output lever 130 having a pivot hole 131, which is mounted on the input pivot pin 121. Thus, it can be seen that the input lever 120 and the output lever 130 lie adjacent to one another and pivot about the same axis. The output lever 130 includes a slot 132, which in the position shown in FIG. 2A, substantially aligns with arm 123A of an L shaped hole 123. The output level 130 further includes an abutment 133 and an arm 134.

A blocking member 150 is in the form of a link being pivotally mounted on the chassis 112 at a pivot 152 and having a abutment 153. Adjacent the abutment 153, there is a hole 154 in which is mounted a pin 161 of a link 160. The link 160 includes a clutch at an end 160A in the form of a pin 140. The pin 140 engages in L shaped hole 123 of the input lever 120 and also in the slot 132 of the output lever 130.

A pawl arm 170 is connected at an end 170A to a pawl (not shown), which releasably retains a latch bolt (e.g., a rotating claw) to secure the door. Movement of the pawl arm 170 from the position shown in FIG. 4A to the position shown in FIG. 4C causes the pawl to rotate and allow the door to open.

Operation of the mechanism is as follows. With the mechanism in the position as shown in FIGS. 2A, 3 and 4A, the pin 140 is located at the end 132A of the slot 132 and hence at an end 125 of an L shaped hole 123. As such, the input lever 120 and the output lever 130 are coupled together for rotation. Further, as seen from FIG. 2A, the abutment 133 of the output lever 130 is not aligned with the abutment 153 of the blocking member 150 (i.e., the abutment 133, the abutment 153 and the pivot 152 are not aligned). Thus, operation of the inside door handle 200 or the outside door handle 202 causes a hole 124 to move in the direction of arrow A of FIG. 2A to the position as shown in FIG. 2C, which results in the arm 134 rotating the pawl arm 170 and thus opening the door. It should be noted that the abutment 133 has bypassed the abutment 153, as shown in FIG. 2C.

With the input lever 120 and the output lever 130 in the position shown in FIG. 2A, the block member 150 can be rotated to the position as shown in FIG. 2B. This has two effects, namely a) the abutment 153 aligns with the abutment 133 (i.e., the abutments 153 and 133 and the pivot 152 are aligned) to prevent movement of output lever 130 and b) the pin 140 is moved (by the link 160) to the end 132B of the slot 132 and hence to the confluence of arms 123A and 123B of the L shape hole 123, i.e., to position 126 (see FIG. 3).

In the event that the inside door handle 200 or the outside door handle 202 is operated, movement of the input lever 120 causes the arcuate arm 123B of the L shaped hole 123 to move past the pin 140, which remains stationary. Compare FIGS. 2B and 2D). Accordingly, if the input lever 120 and the outside lever 130 corrode or otherwise stick together, then the door is still prevented from opening by engagement between the abutments 133 and 153. Under these circumstances, it is not possible to move the associated door handle and this acts as an indicator that the mechanism is malfunctioning. Such an indicator is useful since a malfunction can be determined simply by attempting to operate the door handles. No internal examination of the door is required.

The mechanism can be used in the transmission path between an outside door handle and a latch bolt (i.e., it can be used to lock the door). Alternatively, the mechanism can be used between both the inside and outside door handles and the latch bolt, i.e., it can be used to superlock (or deadlock) the door. Alternatively, it can be used between an inside door and a latch bolt, especially on a rear door of a vehicle, i.e.4 to provide a child safety function of the door latch.

What is claimed is:

1. A latch mechanism, comprising:
   an input member having a first input position and a second input position;
   an output member having a first output position and a second output position;
   a clutch having a coupled condition and a decoupled condition, wherein said coupled condition permits movement of said input member from said first input position to said second input position to cause movement of said output member from said first output position to said second output position and said decoupled condition prevents movement of said input member from said first input position to said second input position from causing movement of said output member from said first output position to said second output position; and
   a stationary blocking member blocking movement of at least one of said input member and said output member when said clutch is in said decoupled condition.

2. The latch mechanism as defined in claim 1 wherein said stationary blocking member prevents said output member from moving to said second output position.

3. The latch mechanism as defined in claim 2 wherein said stationary blocking member does not prevent said input member from moving to said second input position.

4. The latch mechanism as defined in claim 1 in wherein said stationary blocking member prevents said input member from moving to said second input position.

5. The latch mechanism as defined in claim 4 wherein said stationary blocking member prevents said output member from moving to said second output position.

6. The latch mechanism as defined in claim 1 wherein said input member is rotatable about an input pivot between said first input position and said second input position.

7. The latch mechanism as defined in claim 1 wherein said output member is rotatable about an output pivot between said first output position and said second output position.

8. The latch mechanism as defined in claim 1 wherein said input member is connectable to an inside door handle.

9. The latch mechanism of claim 1 wherein said stationary blocking member is fixed against movement relative to at least one of a latch and a vehicle chassis.

10. The latch mechanism as defined in claim 1 further including a transmission path between said input member and said output member, wherein said clutch is provided in said transmission path.

11. The latch mechanism as defined in claim 1 wherein said input member is connectable to an outside door handle.

12. The latch mechanism as defined in claim 11 wherein in a coupled state, said clutch translates upon movement of said input member between said first input position and said second input position to actuate said output member.

13. A latch mechanism, comprising:
    an input member having a first input position and a second input position;
    an output member having a first output position and a second output position;
    a clutch having a coupled condition and a decoupled condition, wherein said coupled condition permits movement of said input member from said first input position to said second input position to cause movement of said output member from said first output position to said second output position and said decoupled condition prevents movement of said input member from said first input position to said second input position from causing movement of said output member from said first output position to said second output position, wherein said clutch rotates to couple said input member and said output member; and
    a stationary blocking member blocking movement of at least one of said input member and said output member when said clutch is in said decoupled condition.

14. The latch mechanism as defined in claim 13 wherein said clutch is pivotably mounted to said at least one of said input member and said output member.

15. A latch mechanism comprising:
    an input member having a first input position and a second input position;

an output member having a first output position and a second output position;

a clutch having a coupled condition and a decoupled condition, wherein said coupled condition permits movement of said input member from said first input position to said second input position to cause movement of said output member from said first output position to said second output position and said decoupled condition prevents movement of said input member from said first input position to said second input position from causing movement of said output member from said first output position to said second output position, said clutch being rotatable between said coupled and said decoupled position; and a blocking member blocking movement of at least one of said input member and said output member when said clutch is in said decoupled condition.

* * * * *

UNITED STATES PATENT AND TRADEMARK OFFICE
CERTIFICATE OF CORRECTION

PATENT NO. : 6,986,534 B2
DATED : January 17, 2006
INVENTOR(S) : Fisher

It is certified that error appears in the above-identified patent and that said Letters Patent is hereby corrected as shown below:

<u>Title page,</u>
Insert Item:
-- [30]     Foreign Application Priority Data
Mar. 2, 2001     (GB) ............................0105120.0 --.

Signed and Sealed this

Thirteenth Day of June, 2006

JON W. DUDAS
*Director of the United States Patent and Trademark Office*